(No Model.)

H. F. CAMPBELL.
ELECTRICAL CABLE.

No. 290,854. Patented Dec. 25, 1883.

Witnesses.
John F. C. Vreinkerk
Arthur Lippielen

Inventor.
Henry F. Campbell
by Crosby & Gregory
Attys.

United States Patent Office.

HENRY F. CAMPBELL, OF CONCORD, NEW HAMPSHIRE.

ELECTRICAL CABLE.

SPECIFICATION forming part of Letters Patent No. 290,854, dated December 25, 1883.

Application filed August 20, 1883. (No model.)

*To all whom it may concern:*

Be it known that I, HENRY F. CAMPBELL, of Concord, county of Merrimac, State of New Hampshire, have invented an Improvement in Electrical Cables, of which the following description, in connection with the accompanying drawings, is a specification, like letters on the drawings representing like parts.

My invention relates to an electrical cable composed of a series of independent conductors, each provided with an anti-inductive shield, and has for its object to provide a complete electric circuit for the currents generated in the said shields, which currents are thereby prevented from escaping or passing to and affecting the conductors inclosed in the shields.

The invention is shown as embodied in a cable composed of a series of wires, each provided with an anti-inductive shield or envelope, a portion of the said shields being insulated from the rest throughout the length of the cable, but electrically connected at the ends thereof, so that the connected shields form a complete electric circuit independent of the wires inclosed within them.

Figure 1:
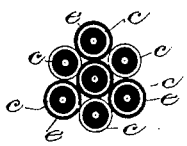
Figure 2:
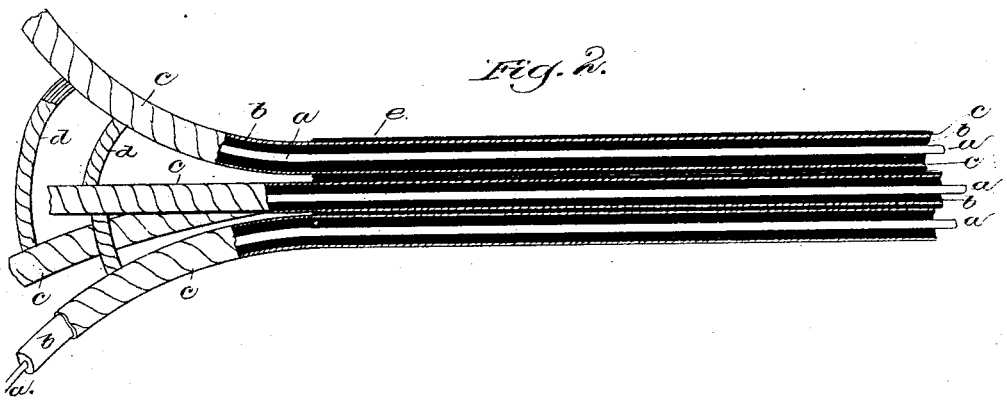

Figure 1 is a transverse section of a cable embodying this invention, and Fig. 2 a longitudinal section of a portion thereof near one end of the cable.

The cable is composed of a series of independent wires or conductors. $a$, each provided with an insulating-covering, $b$, and each being intended to form a portion of an independent electric circuit containing telephonic or other electrical instruments. Each insulated conductor $a\,b$ is provided with a shield composed of paramagnetic or combined paramagnetic and diamagnetic material, as described in application for Letters Patent No. 97,028, filed June 4, 1883. A portion of the shields $c$ is insulated from the remainder, as by coverings $e$; or, if desired, each shield may be insulated from its neighbors, and the shields that are insulated from one another in the body of the cable are connected together at the ends thereof by a conductor, $d$, of electricity, thus forming a complete metallic circuit within the cable and independent of the wires $a$. By this arrangement a current generated in the shield of any one of the wires $a$ will pass throughout the circuit composed of the said shield, the connecting-wires $d$, and other connected shield or shields, with little tendency to escape to the wires $a$ inclosed in either of the said shields. If desired, all the shields composing one part of the shield-circuit may be in contact with one another, or an independent conductor may be employed to form the return-circuit for all the shields; but I do not herein specifically claim the latter arrangement, as it will form the subject of another application for Letters Patent.

As a means of connecting the shields at the ends of the cable, they may be extended beyond the insulating material $e$, as shown at Fig. 2, and then brought into contact with one another.

I claim—

1. In a cable, a series of independent insulated conductors, each provided with an anti-inductive shield, as described, the said shields forming a portion of a metallic circuit in the cable independent of the said conductors inclosed in the shields, substantially as described.

2. A cable composed of a series of independent insulated conductors, each provided with an anti-inductive shield, as described, a portion of the said shields being insulated from the remainder in the body of the cable, but electrically connected at the ends thereof, each shield thereby forming a portion of a complete electric circuit within the cable, and independent of the insulated conductors inclosed in the shields, substantially as described.

In testimony whereof I have signed my name to this specification in the presence of two subscribing witnesses.

HENRY F. CAMPBELL.

Witnesses:
W. H. SIGSTON,
JOS. P. LIVERMORE.